United States Patent [19]
Weber et al.

[11] 3,973,653
[45] Aug. 10, 1976

[54] DISC BRAKE

[75] Inventors: Otto Weber; Horst Hartwig, both of Wolfburg; Günter Münchenberg, Fallersleben, all of Germany

[73] Assignee: Volkswagenwerk Aktiengesellschaft, Wolfsburg, Germany

[22] Filed: Feb. 12, 1973

[21] Appl. No.: 332,003

[30] Foreign Application Priority Data
Feb. 16, 1972 Germany............................ 2207162

[52] U.S. Cl............................ 188/218 A; 192/30 V
[51] Int. Cl.².................... F16D 65/12; F16F 15/10
[58] Field of Search............ 188/1 B, 205 A, 218 A, 188/218 XL, 251 M; 192/107 R, 107 M, 30 V; 64/1 V

[56] References Cited
UNITED STATES PATENTS

| | | | |
|---|---|---|---|
| 1,780,710 | 11/1930 | Kattwinkel | 192/107 R |
| 2,745,518 | 5/1956 | Bachman | 188/264 A X |
| 3,509,973 | 5/1970 | Kimata | 188/218 A |

FOREIGN PATENTS OR APPLICATIONS

| | | | |
|---|---|---|---|
| 158,902 | 9/1954 | Australia | 188/218 X |
| 1,177,067 | 12/1958 | France | 188/218 X |
| 1,230,274 | 4/1971 | United Kingdom | 188/218 A |

*Primary Examiner*—George E. A. Halvosa
*Attorney, Agent, or Firm*—Ernest F. Marmorek

[57] ABSTRACT

A disc brake with a friction disc having a pair of annular friction surfaces placed between brake shoes disposed about such friction surfaces for coming into frictional engagement therewith when the brake is actuated, the friction disc including a cast member located in the region of the surfaces which come into frictional contact with the brake shoes when the brake is actuated, the cast member including a separating joint running oblique with respect to the friction surfaces.

10 Claims, 3 Drawing Figures

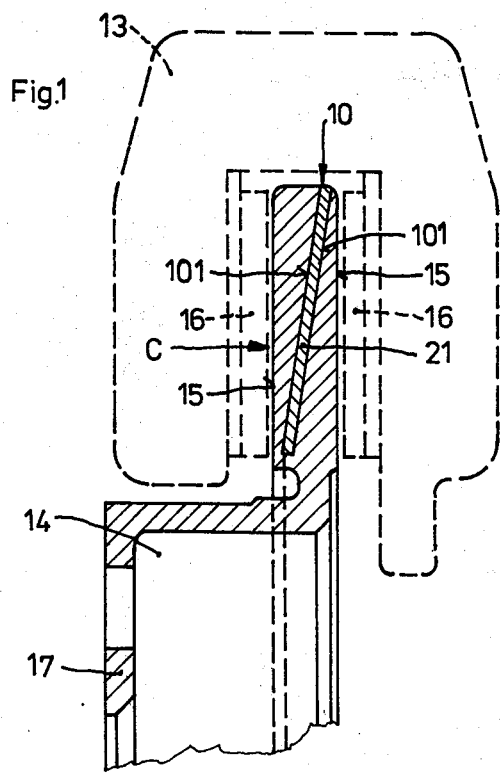

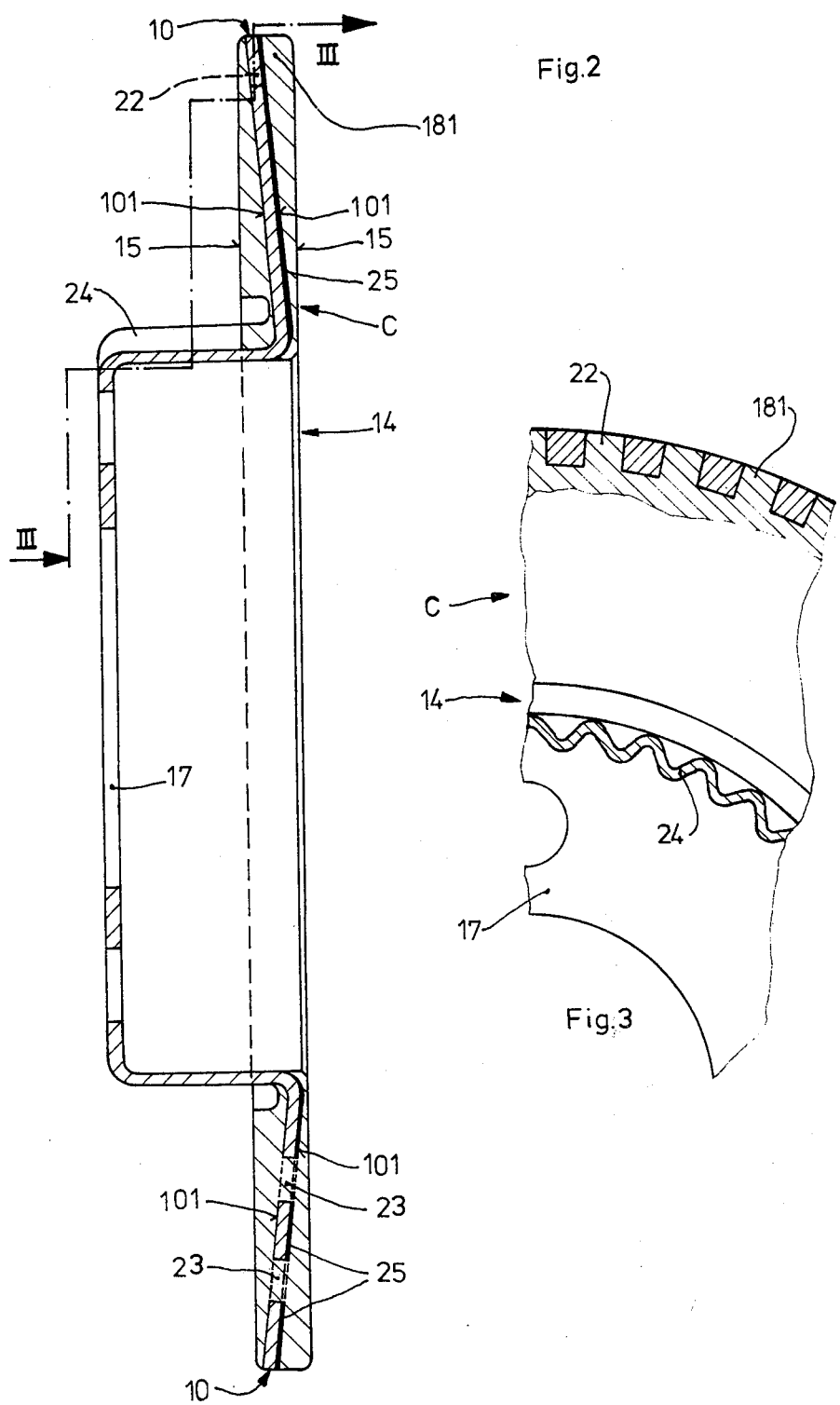

DISC BRAKE

FIELD OF THE INVENTION

The present invention relates to a disc brake and the friction disc used therein which is placed between a pair of circular friction surfaces and having a separating joint provided therein for the damping of oscillations.

BACKGROUND OF THE INVENTION

It is known from the German OLS No. 1,154,312 to use a friction disc within a disc brake the individual discs of which are arranged coaxially and parallel with respect to each other and are coupled with each other by means of oscillation damping means. This arrangement serves the purpose to damp the noises which arise during the operating of the brake and which are generated by the fact that the friction brake shoes which are pressed against the friction disc, set the disc into oscillations. It turned out to be that the proposed object in the above-mentioned OLS cannot be satisfactorily attained by the proposed solution.

SUMMARY OF THE INVENTION

It is, therefore, an object of the present invention to create a satisfactory and reliable damping of the oscillations in the type of disc brake referred to above by the employment of means having a relatively simple construction.

According to the present invention the friction disc in its region containing the friction surfaces and which is adapted to be brought into frictional coupling with the brake shoes of the friction brake is provided with a continuous cast member having a seam or joint provided therein at such region and running oblique with respect to the friction surfaces.

The direction of the separating seam or joint, according to the present invention, results in a substantial suppression or damping of the tone characteristics which have any substantial amplitude. Along the separating seam or joint a disc or a member for securing the friction disc can be cast into.

The friction disc as well as the securing means are usually made and, preferably made, from steel sheets, in order to provide an improved positive coupling of such sheet steel material with the surrounding cast material, the sheet material can be provided within the casting with recesses which become filled with the casting material. The sheet metal in the rim or end region of the friction disc will have a toothed finish appearance.

It turned out to be advantageous to provide a temperature resistant layer between the sheet material and the cast material in order to prevent a partial or complete melting together of the surfaces of the separating seam or joint with the cast material into which it is embedded.

In the event the member serving for the securing of the friction disc is in the form of a sheet metal member and protrudes into the separating seam or joint and has been cast in place there, then it is advantageous, according to the present invention, when in its transition region to the cast part which is to come into frictional engagement with the friction brake shoes, it is provided with corrugations in order to provide not only a good coupling between the sheet metal portion and the cast member but also to prevent a thermal deformation of the friction brake member and to serve also as a good heat conductor due to its cooling fin effect.

BRIEF DESCRIPTION OF THE DRAWING

The invention will become more readily apparent from the following description of preferred embodiments thereof shown, by way of example, in the accompanying drawings, in which:

FIG. 1 is a partial cross-sectional view through a friction disc brake;

FIG. 2 is a cross-sectional view through a friction disc of another embodiment according to the present invention; and FIG. 3 is a partial sectional view of a broken away part of the disc of FIG. 2, the section being taken along line III—III in FIG. 2.

DESCRIPTION OF THE PREFERRED EMBODIMENTS

With reference to FIGS. 1 and 2, the friction disc 14 which is to be used in a friction disc brake 13, partially shown in sectional view in FIGS. 1, 2 and 3, is provided with a continuous cast member C having a substantially rectangular cross-section, such member C being provided with friction surfaces 15 and being in the region of the disc brake which comes into frictional engagement with the brake shoes 16 of the friction disc brake 13. Into this member C, of the friction disc 14, which is extremely susceptible to oscillations, a separating joint or seam 10 is built into which runs oblique with respect to the friction surfaces 15 in order to tune out of the discrete eigen-frequencies and, thereby to attain a substantial reduction of the noise which otherwise would be generated by the disc brake.

The disc brake 13 is further provided with a securing member 17 which secures it to the remaining part of the vehicle in a known manner, therefore, not described in detail.

Into the member C of the disc brake 14 a separating joint 10 is placed and embedded by being cast there in the form of a disc, as it is illustrated in FIG. 1, or as in FIGS. 2 and 3, the disc 21 itself is the extension of the securing member 17 and in both cases it is a sheet metal. Such sheet metal 17 or 21 which is embedded in the cast member C, in the edge regions 181 of the member C which comes into the frictional coupling with the brake shoes 16, has a toothed or ratched formation, as indicated at 22 in FIG. 3. The sheet metal embedded in the casting C can be provided also with recesses 23 which become filled in by the casting material used for the member C and, thereby to provide for a good positive coupling between the member C and the sheet metal joint 17 or 21.

In order to prevent a thermal deformation of the friction disc 14, in the embodiment illustrated in FIGS. 2 and 3, on the member 17 serving for the securing of the friction disc 14, at the region of its transition into the member C intended for the friction coupling with the brake shoes 16, there are corrugations 24 formed which extend into the member C undergoing the frictional coupling with the brake shoes 16. As mentioned already above, the corrugations 24 serve for heat conduction due to their effect as cooling fins.

In order to prevent a melting together of the separating joint surfaces 101 of the cast member C with the disc 17 or 21 cast there into, the invention provides for a temperature resistant layer 25 on such surfaces 101.

As mentioned above, the illustrated and described embodiments are only exemplary realizations and, within the scope of the invention, variations are possible. For example, the disc 21 which is cast into the member C can be made from a heat resistant non-metallic material and, the temperature resistant layer 25 which is to prevent the melting together of the separating surfaces 101 with the disc 17 and 21 can be made from mica or a similar synthetic material.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a disc brake, a friction disc having a pair of annular friction surfaces, brake shoes disposed about said friction surfaces for coming into frictional engagement with said friction surfaces when the brake is actuated, said friction disc comprising a cast member located in the region of said brake surfaces which come into frictional contact with said brake shoes when the brake shoes are actuated, said cast member comprising a separating joint means running oblique with respect to said friction surfaces.

2. The combination as claimed in claim 1, wherein said separating joint means comprises a disc.

3. The combination as claimed in claim 2, wherein said disc comprises recesses formed therein filled with the cast material of said cast member.

4. The combination as claimed in claim 2, wherein said disc at the edge portions thereof has a toothed finishing thereon.

5. The combination as claimed in claim 2, wherein between said disc and the cast member surrounding said disc a layer of temperature-resistant material is provided for preventing at least partly a melting of said disc together with the cast member.

6. The combination as claimed in claim 1, said friction disc comprises a securing means, said separating joint comprising a portion of said securing means protruding into said cast member.

7. The combination as claimed in claim 6, wherein said disc comprises recesses formed therein filled with said cast material of said cast member.

8. The combination as claimed in claim 6, wherein said disc at the edge portions thereof has a toothed finishing thereon.

9. The combination as claimed in claim 6, wherein between said disc and the cast member surrounding said disc a layer of temperature resistant material is provided for preventing at least partly a melting of said disc together with the cast member.

10. The combination as claimed in claim 6, wherein said securing means is provided with corrugations extending into the region of said disc coming into friction contact with said brake shoes.

* * * * *